(12) United States Patent
Hirata

(10) Patent No.: US 9,849,632 B2
(45) Date of Patent: Dec. 26, 2017

(54) MOLD MATERIAL, MOLDING METHOD, MOLD OBJECT, AND MOLDING APPARATUS

(71) Applicant: SEIKO EPSON CORPORATION, Tokyo (JP)

(72) Inventor: Koki Hirata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 14/557,605

(22) Filed: Dec. 2, 2014

(65) Prior Publication Data

US 2015/0159007 A1    Jun. 11, 2015

(30) Foreign Application Priority Data

Dec. 10, 2013    (JP) .................. 2013-254767

(51) Int. Cl.
| | |
|---|---|
| *B29C 67/00* | (2017.01) |
| *B29C 67/04* | (2017.01) |
| *C08L 33/12* | (2006.01) |
| *B29C 64/135* | (2017.01) |
| *B29C 64/165* | (2017.01) |
| *C08J 5/00* | (2006.01) |
| *B29K 105/00* | (2006.01) |
| *B29K 105/16* | (2006.01) |
| *B29K 101/10* | (2006.01) |
| *B29K 101/12* | (2006.01) |

(Continued)

(52) U.S. Cl.
CPC ........ *B29C 67/0066* (2013.01); *B29C 64/135* (2017.08); *B29C 64/165* (2017.08); *B29K 2101/10* (2013.01); *B29K 2101/12* (2013.01); *B29K 2105/0058* (2013.01); *B29K 2105/16* (2013.01); *B33Y 10/00* (2014.12); *B33Y 30/00* (2014.12); *B33Y 70/00* (2014.12); *C08L 2201/54* (2013.01); *C08L 2205/22* (2013.01)

(58) Field of Classification Search
CPC ... C08L 33/12; C08L 2201/54; C08L 2205/22
USPC .......... 524/490; 501/133; 264/670; 428/407
See application file for complete search history.

(56) References Cited

U.S. PATENT DOCUMENTS

| | | | |
|---|---|---|---|
| 5,432,224 A * | 7/1995 | Ryuhgoh .............. | B22F 1/0059 501/94 |
| 6,007,318 A | 12/1999 | Russell et al. | |

(Continued)

FOREIGN PATENT DOCUMENTS

| | | |
|---|---|---|
| JP | 2004-538191 A | 12/2004 |
| JP | 2005-059324 A | 3/2005 |

(Continued)

*Primary Examiner* — Fred M Teskin
(74) *Attorney, Agent, or Firm* — Global IP Counselors, LLP

(57) ABSTRACT

A molding apparatus includes a heating section, a spreading section, a molding section, a drawing section and a curing section. The heating section which heats a mold material including particles and a binder agent which bonds together the particles, to a temperature equal to or higher than the melting point of the binder agent and forms a fluid mold material. The spreading section forms a mold layer by spreading the fluid mold material. The molding section layers the mold layers. The drawing section applies UV ink to a desired region of the mold layer. The curing section cures the UV ink applied to the desired region of the mold layer.

7 Claims, 2 Drawing Sheets

(51) Int. Cl.
  *B33Y 10/00*  (2015.01)
  *B33Y 30/00*  (2015.01)
  *B33Y 70/00*  (2015.01)

(56) References Cited

U.S. PATENT DOCUMENTS

| | | |
|---|---|---|
| 2005/0003189 A1 | 1/2005 | Bredt et al. |
| 2009/0224442 A1* | 9/2009 | Sakata .................... A61C 7/00 264/624 |
| 2011/0291326 A1 | 12/2011 | Okamoto et al. |
| 2013/0217823 A1 | 8/2013 | Okamoto et al. |

FOREIGN PATENT DOCUMENTS

| | | |
|---|---|---|
| JP | 2005-144870 A | 6/2005 |
| JP | 2007-502713 A | 2/2007 |
| JP | 2011-246575 A | 12/2011 |

* cited by examiner

MOLD MATERIAL, MOLDING METHOD, MOLD OBJECT, AND MOLDING APPARATUS

CROSS-REFERENCE TO RELATED APPLICATIONS

This application claims priority to Japanese Patent Application No. 2013-254767 filed on Dec. 10, 2013. The entire disclosure of Japanese Patent Application No. 2013-254767 is hereby incorporated herein by reference.

BACKGROUND

Technical Field

The present invention relates to a mold material, a molding method, a mold object, and a molding apparatus.

Related Art

Layer molding method is one method where a three dimensional solid model (mold object) is molded. As the layer molding method, there is proposed, for example, a light molding method where each cross sectional layer of a mold object is formed by a photo-curable resin being layered and selectively cured using a laser, a powder sintering method where each layer is formed by layering a powder material while the powder material is selectively fused and fixed using a laser, a melt deposition method where each layer is formed by depositing a thermoplastic material by heating and pushing out the thermoplastic resin from a nozzle, a sheet layering method where each layer is formed by a sheet material such as paper being cut into the cross sectional shape of a model and layered and adhered, and the like.

A method of molding a mold object is disclosed in Japanese Unexamined Patent Application Publication No. 2004-538191 where a powder mold material is layered while a liquid binding agent is applied (discharged) using an ink jet system and each cross sectional layer is formed by binding the mold material together at specific locations.

SUMMARY

However, there are cases in Japanese Unexamined Patent Application Publication No. 2004-538191 where, in a case where a powder material is used as the mold material, the force of discharging, when the liquid binding agent is discharged with regard to a layer of the powder material, scatters a portion of the peripheral powder material. The powder material which is scattered is dispersed into a space where the mold object is formed and becomes attached to a liquid droplet discharging head of a liquid droplet discharging apparatus which discharges the liquid binding agent. If the powder material becomes attached and deposited on the liquid droplet discharging head, there is a concern that a nozzle which discharges the liquid binding agent will become blocked and appropriate discharge of liquid droplets will be impeded.

The present invention is carried out in order to solve the problems described above and is able to be realized as the following examples or aspects.

A mold material according to first aspect is adapted to be used in a molding method including applying liquid droplets to a desired region of a layer formed using the mold material. The mold material includes particles, and a thermoplastic binder which bonds together the particles.

According to the present aspect, the mold material which is configured by particles includes the thermoplastic binder which bonds together the particles. For this reason, it is not easy for the powder to scatter since the powder is secured (bonded) using the thermoplastic binder which bonds together the particles even with, for example, fine particles (a powder) which are easily scattered and dispersed in air.

In the mold material according to the aspect described above, a melting point of the thermoplastic binder is preferably 30° C. or more and 90° C. or less.

According to the present aspect, the melting point of the thermoplastic binder which bonds together the particles is 30° C. or more and 90° C. or less. For this reason, the thermoplastic binder bonds the particles in a solid state, for example, at room temperature of less than 30° C. That is, the particles are held in a state of being bonded and it is difficult for the particles to scatter. In addition, the thermoplastic binder bonds the particles in a state where the thermoplastic binder has dissolved in a case where the mold material is heated to a temperature which is equal to or higher than the melting point of the thermoplastic binder. That is, it is possible to easily spread the mold material in a state where scattering of the particles is suppressed at a temperature which is equal to or higher than the melting point of the thermoplastic binder. It is possible to spread the mold material easily into layers with substantially uniform thickness by using, for example, a squeegee or the like on a horizontal flat plate. Next, the layers of the mold material which are spread are layers with substantially uniform thickness which are solid due to the temperature again being less than 30° C. In this manner, it is possible to obtain a layered structure in order to mold the mold object by heating the mold material to equal to or higher than the melting point of the thermoplastic binder and layering and solidifying while spreading.

In the mold material according to the example described above, the thermoplastic binder is preferably soluble in an aqueous solution.

As in the present example, for example, it is possible for the mold material, where a liquid binding agent or the like remains without being applied or solidified, to be dissolved in an aqueous solution due to the thermoplastic binder which is included in the mold material being soluble in an aqueous solution. That is, it is possible to use a simple method of washing using an aqueous solution and without using a large amount of organic solvent in a case where the mold object where a portion which is bonded (cured) is taken out (is produced) from the layered structure using the mold material.

In the mold material according to the aspect described above, where the thermoplastic binder preferably includes at least one of polyethylene glycol, polyether-modified silicone, water soluble nylon, polycaprolactone diol, paraffin wax, fatty acid, and fatty acid amide.

According to the present aspect, the thermoplastic binder which bonds together the particles includes at least any of polyethylene glycol, polyether-modified silicone, water soluble nylon, polycaprolactone diol, paraffin wax, fatty acid, or fatty acid amide. These are soluble in water, are solid (for example, in a waxy state) at, for example, room temperature (15° C. to 25° C.), and are able to be used as particles at the desired high temperatures. For this reason, the thermoplastic binder bonds the particles in a solid state at room temperature and the particles are bonded in a state where the thermoplastic binder has dissolved in a case of heating to a temperature which is equal to or higher than the melting point of the thermoplastic binder. In addition, it is possible to easily spread the mold material in a state where scattering of the particles is suppressed at a temperature which is equal to or higher than the melting point of the thermoplastic binder. That is, as described above, it is possible to provide the mold material where scattering of the particles is suppressed and forming layers is easy. By using the mold material, it is possible to stably and favorably mold the desired mold object.

In the mold material according to the aspect described above, the particles preferably include one type or two or more types of particles which are selected from acrylic resin particles, silicone resin particles, acrylic silicone resin particles, polyethylene resin particles, polystyrene resin particles, nylon resin particles, polyacrylonitrile resin particles, silicon dioxide particles, and aluminum oxide particles.

As in the present aspect, due to the particles which configure the mold material including one type or two or more types of particles which are selected from acrylic resin particles, silicone resin particles, acrylic silicone resin particles, polyethylene resin particles, polystyrene resin particles, nylon resin particles, polyacrylonitrile resin particles, silicon dioxide particles, or aluminum oxide particles, it is possible to favorably configure the mold material using a method of molding the mold object by discharging the liquid binding agent using an ink jet system or the like and binding the mold material at specific locations.

In the mold material according to the aspect described above, an average spherical equivalent diameter of the particles is preferably 0.1 μm or more and 30 μm or less.

As in the present aspect, due to the average spherical equivalent diameter of the particles which configure the mold material being 0.1 μm or more and 30 μm or less, it is possible for the thickness of each layer in the molding method of molding by layering layers to be, for example, approximately several μm to 100 μm. As a result, it is possible to mold the mold object with more precision.

A molding method according to another aspect includes: heating a mold material including particles and a thermoplastic binder which bonds together the particles, to a temperature equal to or higher than a melting point of the thermoplastic binder and forming a fluid mold material; forming a mold layer by spreading the fluid mold material; applying liquid droplets to a desired region of the mold layer; and curing the liquid droplets applied to the desired region of the mold layer.

The molding method according to the present aspect includes heating the mold material, which includes the particles and the thermoplastic binder which bonds together the particles, to a temperature which is equal to or higher than the melting point of the thermoplastic binder and forming the fluid mold material. Since the mold material which is configured by the particles includes the thermoplastic binder which bonds together the particles, it is not easy for the particles to be scattered due to being secured (bonded) using the thermoplastic binder even with, for example, fine particles (a powder) which are easily scattered and dispersed in air.

In addition, the molding method according to the present aspect includes forming a mold layer by spreading the fluid mold material which is heated to a temperature which is equal to or higher than the melting point of the thermoplastic binder. It is possible to easily spread the mold material in a state where scattering of the particles is suppressed along with the thermoplastic binder which is dissolved at a temperature which is equal to or higher than the melting point of the thermoplastic binder. It is possible to spread the mold material easily into layers with substantially uniform thickness by using, for example, a squeegee or the like on a horizontal flat plate. Next, the layers of the mold material which are spread are layers with substantially uniform thickness which are solid due to the temperature again being less than 30° C.

In addition, the molding method according to the present aspect includes applying the liquid droplets to the desired region of the mold layer and curing the liquid droplets which are applied to the desired region of the mold layer. By curing the desired region of the mold layer, a desired cross sectional shape of the mold object is formed.

In the molding method according to the aspect described above, the liquid droplets are preferably photo-curable ink.

According to the present aspect, since the liquid droplets are photo-curable ink, it is possible to easily cure a desired region of the mold layer by irradiating light onto the liquid droplets which are applied onto the desired region of the mold layer.

In the molding method according to the aspect described above, the liquid droplets are preferably thermosetting ink.

According to the present aspect, since the liquid droplets are thermosetting ink, it is possible to easily cure a desired region of the mold layer by heating the liquid droplets which are applied onto the desired region of the mold layer. Accordingly, it is possible to mold the mold object which is provided with sufficient curing strength by using thermosetting ink and providing a heating means which cures the thermosetting ink in a case such as where curing of the mold layer is not sufficiently performed with photo-curable ink in, for example, a case where the mold material is configured by a material which is highly opaque or a case where the mold layer is configured to be thick.

A mold object according to another aspect is molded using the molding method according to the above described aspect.

The mold object which is molded using the molding method according to the aspect described above is stably molded in a desired shape. That is, according to the present aspect, the mold object is provided which is supplied on the basis of more stable production and more stable product quality.

A molding apparatus according to another aspect includes a heating section, a spreading section, a drawing section, and a curing section. The heating section is configured and arranged to heat a mold material including particles and a thermoplastic binder which bonds together the particles, to a temperature equal to or higher than a melting point of the thermoplastic binder to form a fluid mold material. The spreading section is configured and arranged to spread the fluid mold material to form a mold layer. The drawing section is configured and arranged to apply liquid droplets to a desired region of the mold layer. The curing section is configured and arranged to cure the liquid droplets applied to the desired region of the mold layer.

The molding apparatus according to the present aspect is provided with the heating section which heats the mold material, which includes the particles and the thermoplastic binder which bonds together the particles, to a temperature which is equal to or higher than the melting point of the thermoplastic binder and forms the fluid mold material. Since the mold material which is configured by the particles includes the thermoplastic binder which bonds together the particles, it is not easy for the particles to be scattered due to being secured (bonded) using the thermoplastic binder even with, for example, fine particles (a powder) which are easily scattered and dispersed in air.

In addition, the molding apparatus according to the present aspect is provided with the spreading section which forms the mold layer by cooling the fluid mold material to a temperature which is less than the melting point of the thermoplastic binder after spreading the fluid mold material which is heated to a temperature which is equal to or higher than the melting point of the thermoplastic binder and a molding section which layers the mold layers. It is possible to easily spread the mold material in a state where scattering of the particles is suppressed along with the thermoplastic binder which is dissolved at a temperature which is equal to or higher than the melting point of the thermoplastic binder. With the spreading section, it is possible to spread the mold material easily into layers with substantially uniform thickness by using, for example, a squeegee or the like on a horizontal flat plate. In this manner, it is possible to obtain a favorable layered structure in order to mold the mold object by layering and solidifying the mold material while spreading or by spreading and solidifying the mold material.

In addition, the molding apparatus according to the present aspect is provided with the drawing section which applies the liquid droplets to the desired region of the mold layer which is layered and the curing section which cures the liquid droplets which are applied to the desired region of the mold layer. By curing the desired region of the mold layer which is layered, the desired mold object is formed. With the drawing section, the thermoplastic binder bonds the particles so that it is not easy for the particles to scatter even in a case where, for example, the liquid droplets are discharged using an ink jet system or the like with regard to the mold layers which are layered. As a result, since blocking of the nozzle which discharges the liquid droplets, which is due to the particles which are scattered and dispersed, is suppressed, it is possible to stably and favorably mold the desired mold object.

In the molding apparatus according to the aspect described above, the curing section preferably has a light irradiating unit.

According to the present aspect, it is possible to use photo-curable (for example, ultraviolet rays) ink. It is possible to easily cure the desired region of the mold layer by irradiating light (for example, ultraviolet rays) onto the liquid droplets which are applied to the desired region of the mold layer.

In the molding apparatus according to the aspect described above, the curing section preferably has a heating unit.

According to the present aspect, it is possible to use thermosetting ink as the liquid droplets. It is possible to easily cure the desired region of the mold layer by heating the liquid droplets which are applied to the desired region of the mold layer.

BRIEF DESCRIPTION OF THE DRAWINGS

Referring now to the attached drawings which form a part of this original disclosure.

DETAILED DESCRIPTION OF EXEMPLARY EMBODIMENTS

Embodiments which formulate the present invention will be described below with reference to the drawings. Below, the present invention is not limited to the one embodiment of the present invention. Here, in order for the description to be easy to understand, there are cases where the constituent elements are drawn in the following diagrams with dimensions which are different to the actual dimensions.

As the embodiment, a "mold material", a "molding apparatus", and a "molding method" which uses the mold material and the molding apparatus will be described with respect to layer molding as one technique of molding a three dimensional solid model (mold object). As the method for layer molding, a method is used where a mold object is formed by selectively applying liquid droplets to a thin layer which is configured by a mold material which is to be formed into the cross sectional shape of the mold object and consecutively layering the portions where the liquid droplets are applied while curing.

Below, the details of this will be described.

Mold Material

Figure 1:
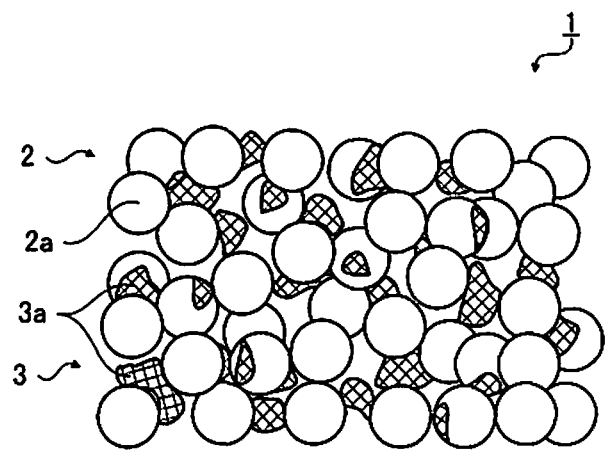
FIG. 1 is a schematic diagram illustrating a state of a mold material according to an embodiment at room temperature.

FIG. 1 is a schematic diagram illustrating a state of a mold material 1 according to an embodiment at room temperature (15° C. to 25° C.).

The mold material 1 is a material (principal component) which is used when molding a three dimensional solid model (mold object) using a layer molding method and layers (referred to below as mold layers), which are for forming each layer which becomes the base for a mold object, that is, each cross sectional shape of the mold object, are formed using the mold material 1.

The mold material 1 is configured from a powder material 2 which is formed from "particles", a binder material 3 which is a "thermoplastic binder", and the like.

Powder Material

The powder material 2 is a main constituent material of the mold object which is configured using the mold material 1. In the powder material 2, it is possible to use powder which is one type or two types of particles which are selected from acrylic resin particles, silicone resin particles, acrylic silicone resin particles, polyethylene resin particles, polystyrene resin particles, nylon resin particles, polyacrylonitrile resin particles, silicon dioxide particles, or aluminum oxide particles.

The powder material 2 is configured from particles 2a. It is preferable that the particles 2a have substantially a spherical shape where the average particle diameter is 0.1 μm or more and 30 μm or less and it is more preferable that the average particle diameter is 1 μm or more and 15 μm or less. In addition, it is preferable for the particles 2a to be closer to a true spherical shape. Due to this, controllability relating to the shape of the mold object and, in particular, controllability of the shape on the sides and corner portions which define the outer shape of the mold object is improved.

In addition, it is preferable that the particle diameter of the particles 2a be equal to or less than the average thickness of the mold layers which are formed using the mold material 1 and it is more preferable that the particle diameter of the particles 2a be half or less of the average thickness of the mold layers. Due to this, it is possible to improve the volume filling ratio of the particles 2a in the mold layers and to improve the mechanical strength of the mold object.

In addition, it is preferable that the powder material 2 includes the particles 2a with particles diameters which are different to each other in the range of the particles diameter described above. Here, the distribution of the particles diameters of the particles 2a may be a distribution which is closer to a Gaussian distribution (a normal distribution) or may be a distribution (a one-sided distribution) such that the maximum values of the particle diameter distribution are on the largest diameter side or the smallest diameter side.

In a case where the particle diameters of the particles 2a is a single value, the volume filling ratio using the particles 2a when forming the mold object does not exceed 69.8% which is the theoretical value when filling with maximum density and the filling ratio is approximately 50% to 60% in practice. In contrast to this, if the powder material 2 includes the particles 2a with particles diameters which are different to each other (where the particles diameters are distributed within a range), the volume filling ratio is improved due to, for example, the particles 2a where the particle diameter is relative small being arranged in the spaces which are formed by the particles 2a which have a relatively large particle diameter. Due to this, it is possible to improve the mechanical strength of the mold object.

Examples of the particles 2a which are used in the powder material 2 are shown below.

As the silicone resin particles, there are the examples of, for example, TOS PEARL (registered trademark) 1110 (particle diameter 11 μm), TOS PEARL 120 (particle diameter 2 m), TOS PEARL 130 (particle diameter 3 μm), TOS PEARL 145 (particle diameter 4.5 μm), TOS PEARL 2000B (particle diameter 6 μm), TOS PEARL 3120 (particle diameter 12 μm), and the like (manufactured by Momentive Performance Materials Inc.) (TOS PEARL: registered trademark).

As the acrylic silicone resin particles, there are the examples of, for example, CHALINE (registered trademark) R-170S (particle diameter 30 μm) (manufactured by Nissin Chemical Industry Co., Ltd.) (CHALINE: registered trademark).

As the acrylic resin particles, there are the examples of, for example, EPOSTAR (registered trademark) L15 (particle diameter 10-15 μm), EPOSTAR M05 (particle diameter 4-6 μm), and EPOSTAR GPH4-14110 (particle diameter 4-11 μm) (manufactured by Nippon Shokubai Co., Ltd.) (EPOSTAR: registered trademark) and TECHPOLYMER (registered trademark) MB-8C (particle diameter 8 μm), TECHPOLYMER MBX-8 (particle diameter 8 μm), and TECHPOLYMER MBP-8 (particle diameter 8 μm) (manufactured by Sekisui Plastics Co., Ltd.) (TECHPOLYMER: registered trademark).

As the polyethylene resin particles, there are the examples of, for example, FLOBEADS (registered trademark) LE-1080 (particle diameter 6 μm), FLOBEADS LE-2080 (particle diameter 11 μm). FLOBEADS HE-3040 (particle diameter 11 μm), and FLOBEADS CL-2080 (particle diameter 11 μm) (manufactured by Sumitomo Seika Chemicals Co., Ltd.) (FLOBEADS: registered trademark).

As the polystyrene resin particles, there are the examples of, for example, TECHPOLYMER (registered trademark) SBX-12 (particle diameter 12 μm) (manufactured by Sekisui Plastics Co., Ltd.).

As the nylon resin particles, there are the examples of, for example, SP-5 (particle diameter 5 μm), SP-10 (particle diameter 10 μm), TR-1 (particle diameter 13 μm), and TR-2 (particle diameter 20 μm) (manufactured by Toray Industries Inc.).

As the polyacrylonitrile resin particles, there are the examples of, for example, A-20 (particle diameter 24 μm) and ASF Series (particle diameter 7 μm) (manufactured by Toyobo Co., Ltd.).

As the silicon dioxide particles, there are the examples of, for example, SO-E1 (particle diameter 0.25 μm) and SO-E2 (particle diameter 0.5 μm) (manufactured by Admatech Co., Ltd.), and SUNSPHERE (registered trademark) H-31 (particle diameter 3 μm), SUNSPHERE H-51 (particle diameter 5 μm), SUNSPHERE H-121 (particle diameter 12 μm), SUNSPHERE H-201 (particle diameter 20 μm), SUNSPHERE L-31 (particle diameter 3 μm), SUNSPHERE L-51 (particle diameter 5 μm), SUNSPHERE NP-30 (particle diameter 4 μm), SUNSPHERE NP-100 (particle diameter 10 μm), and SUNSPHERE NP-200 (particle diameter 200 μm) (manufactured by AGC Si-Tech Co., Ltd.) (SUNSPHERE: registered trademark).

As the aluminum oxide particles, there are the examples of, for example, AO-502 (particle diameter 0.7 μm), AO-809 (particle diameter 10 μm), and AO-820 (particle diameter 20 μm) (manufactured by Admatech Co., Ltd.).

Binder Material

The binder material 3 is a so-called binder which has the function of bonding together the particles 2a when the powder material 2 and the binder material 3 are mixed and dispersed substantially uniformly in the mold material 1. As shown in FIG. 1, the binder material 3 bonds the particles 2a as, for example, binder flakes 3a in flake form when the powder material 2 and the binder material 3 are mixed to be dispersed substantially uniformly.

A polymer compound with thermoplasticity which has a melting point of 30° C. or more and 90° C. or less is used as the binder material 3. As the binder material 3, it is possible to use, for example, water soluble polyethylene glycol as an appropriate example. In detail, as polyethylene glycol with an average molecular weight of 1000 to 80000, there are the examples of, for example, PEG1000 (melting point of 37° C. to 40° C.), PEG1500 (melting point of 38° C. to 41° C.), PEG2000 (melting point of 50° C. to 53° C.), PEG4000 (melting point of 53° C. to 58° C.), and the like. Each form of polyethylene glycol is a solid such as a wax, a jelly, or flakes at room temperature, and melts and is a liquid when the temperature exceeds the melting point.

The binder material 3 is not limited to polyethylene glycol, may be any thermoplastic binder which is solid at room temperature, and may be polyether-modified silicone (KF-6004 with melting point of 45° C. manufactured by Shin-Etsu Chemical Co., Ltd.), water soluble nylon (P-70 with melting point of 85° C. manufactured by Toray Co., Ltd.), polycaprolactone diol (PCL-210 with melting point of 46° C. to 48° C. and PCL-230 with melting point of 55° C. to 58° C. manufactured by Daicel Co., Ltd.) paraffin wax (for example, tetracosane C24H50 with melting point of 49° C. to 52° C., hexatriacontane C36H74 with melting point of 73° C., HNP-10 with melting point of 75° C. manufactured by Nippon Seiro Co., Ltd, HNP-3 with melting point of 66° C. manufactured by Nippon Seiro Co., Ltd, and the like), microcrystalline wax (for example, Hi-Mic-1080 with melting point of 83° C. manufactured by Nippon Seiro Co., Ltd, Hi-Mic-1045 with melting point of 70° C. manufactured by Nippon Seiro Co., Ltd, Hi-Mic2045 with melting point of 64° C. manufactured by Nippon Seiro Co., Ltd, Hi-Mic3090 with melting point of 89° C. manufactured by Nippon Seiro Co., Ltd, 155 micro wax with melting point of 70° C. manufactured by Nippon Petroleum Refining Co., Ltd., and the like), fatty acids (for example, behenic acid with melting point of 81° C., stearic acid with melting point of 72° C., palmitic acid with melting point of 64° C., myristic acid with melting point of 53.8° C., lauric acid with melting point of 43.2° C., and the like), fatty acid esters (for example, arachidic acid methyl ester with melting point of 48° C., polyglycerol fatty acid ester with melting point 60° C. to 80° C., and the like), fatty acid amides (for example, oleic acid amide with melting point of 76° C.), and the like.

Among these, since polyethylene glycol, polyether-modified silicone, water soluble nylon, polycaprolactone diol, paraffin wax (tetracosanoic and hexatriacontane), fatty acids (behenic acid and stearic acid), fatty acid amide (oleic acid amide) are soluble in water or alcohol, it is particularly desirable for it to be possible to use a simple method of washing with water using an aqueous solvent such as water or alcohol without using an organic solvent in large amount in a case of taking out (producing) the mold object.

Mixing Proportions

Mechanical strength is increased as the filling ratio of the particles which configure the powder material 2 in the mold object increases. Therefore, it is preferable to have mixing proportions where the volume which is taken up by the binder material 3 is smaller due to the gaps between the particles which are tightly filled so that the particles are tightly filled in order to increase the mechanical strength of the mold object. Accordingly, the volume ratio of (A) the powder material 2 and (B) the binder material 3 is preferable in the range of 7:3 to 9:1.

EXAMPLE

The mold object 1 according to the present embodiment is formed by mixing TECHPOLYMER MB-8C as (A) the powder material 2 and polycaprolactone diol as (B) the binder material 3 with a volume ratio of (A):(B)=7.5:2.5.

Molding Apparatus

Figure 2:
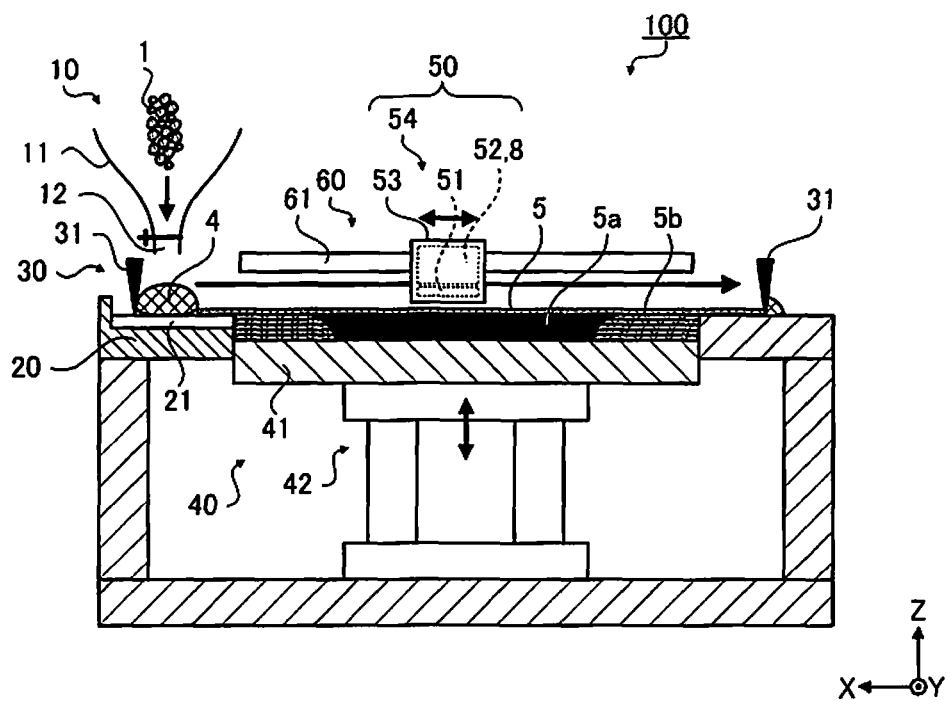
FIG. 2 is a schematic diagram explaining a molding apparatus according to an embodiment.

FIG. 2 is a schematic diagram explaining a molding apparatus 100 according to an embodiment.

In FIG. 2, the Z axis direction is the up and down direction and the Z direction is the upward direction (that is, the −Z direction is the vertical direction), the Y axis direction is the front and back direction and the +Y direction is the forward direction, the X axis direction is the left and right direction and the +X direction is the leftward direction, and the X-Y plane is a plane which is parallel with the plane on which the molding apparatus 100 is arranged.

The molding apparatus 100 is an apparatus which uses the mold material 1 to mold a three dimensional solid model (mold object) using a layer molding method.

The molding apparatus 100 is provided with a material supplying section 10, a heating section 20, a spreading section 30, a molding section 40, a drawing section 50, a curing section 60, a control section (which is not shown in the diagram) which controls each of the sections, and the like.

The material supplying section 10 is a section which supplies the mold material 1 which is contained therein to the heating section 20 and is provided with, for example, a hopper 11 as shown in FIG. 2. The hopper 11 supplies the mold material 1, which is contained inside from a material discharging opening 12 which is positioned above the heating section 20, to the heating section 20.

Here, the material supplying section 10 is not limited to this configuration and may be a configuration (which is not shown in the diagram) where, for example, a loading section which loads and heats a cartridge which contains the mold material 1 is provided and the mold material 1 is supplied to the heating section 20 by the mold material 1 having fluidity by the cartridge which is filled being heated to equal to or higher than the melting point of the binder material 3.

The heating section 20 is provided with a hot plate 21 which is heated to and maintained at a temperature which is equal to or higher than the melting point of the binder material 3. The mold material 1 which is supplied from the material supplying section 10 becomes a fluid mold material 4 which has fluidity by the binder material 3 being dissolved on the hot plate 21. In a case where a plurality of the binder materials 3 are included, heating may be equal to or higher than the lowest melting point. It is desirable that heating be equal to or higher than the melting point of the binder material 3 where the content amount is the highest out of the plurality of types of the binder materials 3 which are included in the mold material 1.

The spreading section 30 is provided with a squeegee 31.

The squeegee 31 is a long and thin plate body which extends in the Y axis direction and which is provided to be able to move in the X axis direction, and it is possible for the fluid mold material 4 to be thinly spread by the fluid mold material 4 being moved over the X-Y plane so as to be pushed in the −X direction.

The spreading section 30 spreads the fluid mold material 4 on a stage 41 which is provided in the molding section 40 and forms a mold layer 5.

The molding section 40 is provided with the stage 41, a stage raising and lowering mechanism 42 which raises and lowers the stage 41 in the Z axis direction. At an initial position which is positioned on the same plane (the same height) as the hot plate 21, the stage 41 configures the X-Y plane over which the fluid mold material 4 is spread using the squeegee 31.

The stage 41 is maintained at room temperature, and the fluid mold material 4 which is spread on the stage 41 loses fluidity as the temperature becomes less than the melting point of the binder material 3 and is layered as the newest mold layer 5 on the mold layer 5 which is previously formed. The fluid mold material 4 which is spread may be left or may be cooled so that the temperature becomes less than the melting point of the binder material 3. As the method for cooling, blowing room temperature or cooled air onto the mold layers 5 from a fan or bringing the mold layer 5 into contact with a cooling plate is possible. The stage 41 may be provided with a heating mechanism (for example, a heater) or a cooling mechanism.

The stage raising and lower mechanism 42 lowers the stage 41 according to the layer thickness of the mold layer 5 which is spread and formed on the stage 41. By lowering the stage 41, the surface of the mold layer 5 is positioned on the same plane (same height) as the hot plate 21, and the X-Y plane, where the fluid mold material 4 is spread using the squeegee 31 and is layered as the mold layer 5, is configured again.

The drawing section 50 is provided with a discharge head 51, a cartridge loading section 52, a carriage 53, a carriage moving mechanism 54 (which is not shown in the diagram), and the like.

The discharge head 51 is provided with a nozzle (which is not shown in the diagram) which discharges ultraviolet ray curable ink (UV ink 8) as "liquid droplets" using an ink jet system onto the mold layer 5 on the stage 41.

The cartridge loading section 52 loads an ink cartridge which contained the UV ink 8 and supplies the UV ink 8 to the discharge head 51.

The carriage 53 is mounted with the discharge head 51 and the cartridge loading section 52 (that is, an ink cartridge) and is moved on the upper surface of the stage 41 using the carriage moving mechanism 54.

The carriage moving mechanism 54 has an X-Y axis linear transport mechanism and moves (scans) the carriage 53 over the X-Y plane.

The drawing section 50 forms a desired image (an image which reflects the cross sectional shape of the mold object) on the mold layer 5 which is spread on the stage 41 using the UV ink 8 due to being controlled by the controlling section (which is not shown in the diagram). In detail, the control section has image information on each cross sectional layer which configures the mold object which is input in advance, controls the positions over which the discharge head 51 is moved and the timing with which the UV ink 8 is discharged according to the image information, and correspondingly applies the UV ink 8 to each of the mold layers 5.

The curing section 60 is provided with an ultraviolet ray irradiating unit 61 as a "light irradiating means" which cures the UV ink 8 which is applied to the mold layer 5.

Molding Method

Next, a molding method where the mold material 1 and the molding apparatus 100 described above are used will be described.

The molding method according to the present embodiment includes the following processes.

(1) heating the mold material 1, which includes the particles 2*a* and the binder material 3 which bonds together particles 2*a*, to a temperature which is equal to or higher than the melting point of the binder material 3 and forming the fluid mold material 4

(2) spreading the fluid mold material 4 and forming the mold layer 5 by cooling to a temperature which is less than the melting temperature of the binder material 3

(3) layering the mold layers 5

(4) applying the UV ink 8 to a desired region of the mold layer 5 which is layered (5) curing the UV ink 8 which is applied to the desired region of the mold layer 5

The molding method will be described below in order with reference to FIG. 2.

From the process after supplying of the mold material 1 to the molding apparatus 100 to the process of realizing the mold object is performed according to controlling by the control section which is provided in the molding apparatus 100.

First, the mold material 1 which includes the particles 2*a* and the binder material 3 is prepared and is filled into the material supplying section 10 (the hopper 11). It is desirable that the ratios of the particles 2*a* and the binder material 3, the particle diameter of the particles 2*a*, the distribution of the particles diameters, the volume filling ratio using the particles 2*a*, the layer thickness of the mold layer 5 which is formed by spreading, and the like are appropriately set according to the molding specifications of the mold object. In addition, it is preferable that the dispersing of the particles 2*a* and the binder material 3 is uniform.

Next, the mold material 1 is supplied from the material supply section 10 to the heating section 20 (the hot plate 21). The amount of the mold material 1 which is supplied to the heating section 20 is controlled to be an amount which is equivalent to one layer of the mold layer 5.

The heating section 20 heats the mold material 1 to a temperature which is equal to or higher than the melting point of the binder material 3 using the hot plate 21 and forms the fluid mold material 4 due to the binder material 3 being dissolved.

Next, the fluid mold material 4 is spread on the stage 41 using the spreading section 30. In detail, the fluid mold material 4 is pushed and stretched over the surface of the stage 41 by the squeegee 31, which abuts with the +X side of the mold material 1 (the fluid mold material 4) which takes on fluidity, being moved in the −X direction.

The stage 41 is maintained at room temperature and the fluid mold material 4 which is spread on the stage 41 is cooled to room temperature. Due to the fluid mold material 4 being cooled to room temperature, the binder material 3 sets and the mold layer 5 is formed.

The layer thickness of the mold layer 5 is controlled according to the specifications of the spreading using the squeegee 31. In detail, it is desirable that appropriate setting be performed so as to have the desired thickness since the layer thickness of the mold layer 5 changes due to the size of the gap between the lower edge of the squeegee 31 and the X-Y plane (for example, the surface of the stage 41 at an initial position), the movement speed of the squeegee 31, the viscosity of the fluid mold material 4, and the like.

Next, the drawing section 50 forms a desired image using the UV ink 8 on the mold layer 5 which is formed on the stage 41. In detail, the UV ink 8 is applied to positions which correspond to the cross sectional shape of the mold object by the UV ink 8 being discharged while the discharge head 51 is moved according to image information on each cross sectional layer which configures the mold object which is input into the control section in advance.

Figure 3:
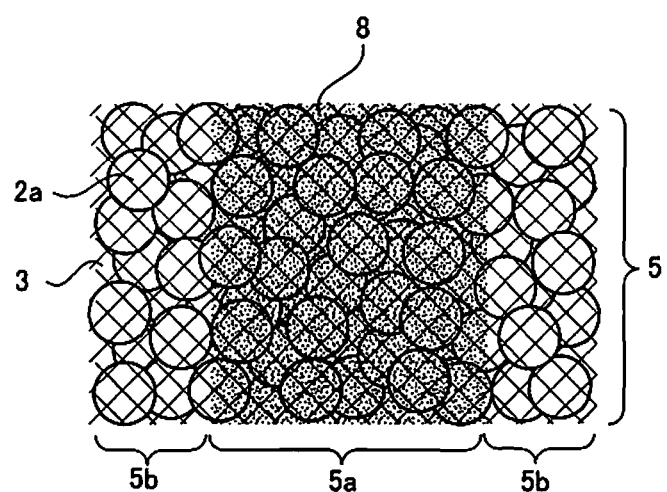
FIG. 3 is a schematic diagram illustrating a situation where liquid droplets are applied to a desired region of a mold layer.

FIG. 3 is a schematic diagram illustrating a situation where the UV ink 8 (the liquid droplets) is applied to a desired region of the mold layer 5 using the molding apparatus 100.

Due to the binder material 3 which is dispersed in flakes in FIG. 1 being dissolved and set one time, the volume filling ratio using the particles 2*a* is increased and the binder material 3 is substantially uniformly distributed over the entirety of the mold layer 5. The UV ink 8 which is selectively applied to desired positions penetrates the region which includes the particles 2*a* and the binder material 3 as shown in FIG. 3 and a mold section 5*a* is formed.

Next, the curing section 60 cures the UV ink 8 which is applied to the mold layer 5. In detail, the mold section 5*a* is cured by ultraviolet rays being irradiating onto the mold layer 5 using the ultraviolet ray irradiating unit 61 and the UV ink 8 which is applied to the mold layer 5 being cured after the carriage 53 retreats from above the stage 41.

Here, in order for curing of the UV ink 8 to maintain interface joining strength with the UV ink 8 which is applied to the mold layer 5 which is layered next, irradiating of ultraviolet rays and curing to the extent that photo-polymerization is not complete is preferable.

In addition, the molding apparatus 100 may be configured so that the ultraviolet ray irradiating unit 61 is mounted in the carriage 53 and there may be a method of irradiating of ultraviolet rays and curing while the UV ink 8 is being applied.

Next, the stage raising and lower mechanism 42 lowers the stage 41 according to the layer thickness of the mold layer 5 which is formed by being spread on the stage 41. Due to the stage 41 being lowered, the surface of the mold layer 5 is positioned on the same surface of the hot plate 21 and an X-Y plane, where the fluid mold material 4 is spread and is layered as the mold layer 5, is configured again using the stage 41.

After this, from the process of supplying of the mold material 1 from the material supply section 10 to the heating section 20 to the process of lowering of the stage 41 is repeated and the mold layer 5 is layered. During the repeating, the process of supplying of the mold material 1 from the material supply section 10 to the heating section 20 to the process of lowering of the stage 41 is repeated from the second time onward on the mold layer 5 which is previously formed. In addition, the mold layer 5 may be formed at a location other than on the stage 41 due to the process of supplying of the mold material 1 from the material supply section 10 to the heating section 20 to the process of lowering of the stage 41 and may be layered on the mold layer 5 which is previously formed.

If the layered is completed so that the layering of the mold layers 5 reaches a height which corresponds to the molding of the mold object, the final product is taken out from the stage 41 and the mold object is produced. In detail, a non-mold section 5*b* where the UV ink 8 is not applied is separated by being dissolved or the like and the mold object is produced from the mold section 5*a*. The non-mold section 5*b* is easily dissolved since it is a region which is held by the binder material 3 which is soluble in water.

As described above, it is possible for the following effects to be obtained according to the mold material, the molding method, the mold object, and the molding apparatus.

In the mold material according to the present embodiment, the mold material 1 which is configured by the particles 2*a* includes the binder material 3 which bonds together the particles 2*a*. For this reason, it is not easy for the particles 2*a* to be scattered due to being secured (bonded) using the binder material 3 which bonds together the particles 2*a* even with, for example, fine particles (a powder) which are easily scattered and dispersed in air. As a result, scattering and dispersing of the particles 2*a* is suppressed even with a method of molding a mold object by, for example, the UV ink 8 being discharged onto the mold material 1 using an ink jet system and the mold material 1 being bonded at specific locations. For this reason, the nozzle which discharges the UV ink 8 is not (or is suppressed from being) blocked due to the particles 2*a*, it is possible to stably and favorably mold the desired mold object.

The binder material 3 which bonds together the particles 2*a* has thermoplasticity and has a melting point of 30° C. or more and 90° C. or less. For this reason, the binder material 3 bonds the particles 2*a* in a solid state, for example, at room temperature of less than 30° C. That is, the particles 2*a* are held in a state of being bonded and it is difficult for the particles 2*a* to scatter. In addition, the binder material 3 dissolves and bonds the particles 2*a* in a case where the mold material 1 is heated to a temperature which is equal to or higher than the melting point of the binder material 3. That is, it is possible to easily spread the mold material 1 in a state where scattering of the particles 2*a* is suppressed at a temperature which is equal to or higher than the melting point of the binder material 3. Next, by the layers of the mold material 1 which are spread being cooled again a temperature which is less than 30° C., it is possible to obtain layers with substantially uniform thickness which are solid. In this manner, it is possible to obtain a layered structure in order to mold the mold object by layering and solidifying the mold material 1 while spreading. The binder material 3 bonds the particles 2*a* without the peripheral particles 2*a* easily scattering even in a case where, for example, the UV ink 8 is discharged using an ink jet system with regard to the layered structure of the mold material 1. As a result, since blocking of the nozzle which discharges the UV ink 8, which is due to the particles 2*a* which are scattered and dispersed, is suppressed, it is possible to stably and favorably mold the desired mold object.

In addition, it is possible for the mold material 1 (the non-mold section 5*b*), which remains without any applying of the UV ink 8 or solidifying, to be dissolved in an aqueous solution due to the binder material 3 which is included in the mold material 1 being soluble in an aqueous solution. That is, it is possible to use a simple method of washing using an aqueous solution in a case where the mold object where a portion which is bonded (cured) (the mold section 5*a*) is taken out (is produced) from the layered structure using the mold material 1 (the mold layers 5).

In addition, it is possible to shorten the production time by softening the thermoplastic binder due to warming during production.

Here, the aqueous solution is water, a non-organic solvent such as an aqueous solution of a mineral salt, a water soluble organic solvent, or a liquid mixture of these.

As the water soluble organic solvent, there are the examples of alcohols such as alcohols such as methanol, ethanol, butanol, IPA (isopropyl alcohol), N-propyl alcohol, butanol, isobutanol, TBA (tert-butanol), butanediol, ethyl hexanol, and benzyl alcohol, glycol ethers such as 1,3 dioxolane, ethylene glycol dimethyl ether, ethylene glycol dimethyl ether, propylene glycol monomethyl ether, ethylene glycol monomethyl ether, ethylene glycol monomethyl ether, and ethylene glycol monomethyl ether acetate, glycols such as ethylene glycol, diethylene glycol, triethylene glycol, and propylene glycol, ether solvents such as isopropyl ether, methyl cellosolve, cellosolve, butyl cellosolve, dioxane, MTBE (methyl tertiary butyl ether), and butyl carbitol.

Out of these water soluble solvents, water is preferable in terms of safety even in cases where water, where its volatilization is steam, is heated and produced.

In addition, it is possible to shorten the overall molding time which includes up to production in a case where the mold object which is molded using a portion which is bonded (cured) is taken out (produced) from the layered structure of the mold material by a water soluble solvent such as alcohol being mixed in appropriate amounts or the like in a case where the thermoplastic binder which is highly soluble in, for example, alcohol is used as the binder material 3.

In addition, the binder material 3 which bonds together the particles 2*a* includes polyethylene glycol. Polyethylene glycol is soluble in water, has a different melting point depending on polymerization, is solid (for example, in a waxy state) at, for example, room temperature (15° C. to 25° C.), and is able to be used as particles at the desired high temperatures. For this reason, the binder material 3 bonds the particles 2*a* in a solid state at room temperature and the binder material 3 bonds the particles 2*a* in a liquid state in a case of being heating to a temperature which is equal to or higher than the melting point of the binder material 3. In addition, it is possible to easily spread the mold material 1 in a state where scattering of the particles 2*a* is suppressed at a temperature which is equal to or higher than the melting point of the binder material 3. That is, as described above, it is possible to provide the mold material 1 where scattering of the particles 2*a* is suppressed and forming layers is easy, and by using the mold material 1, it is possible to stably and favorably mold the desired mold object.

In addition, due to the particles 2*a* which configure the mold material 1 including one type or two or more types of particles which are selected from acrylic resin particles, silicone resin particles, acrylic silicone resin particles, polyethylene resin particles, polystyrene resin particles, nylon resin particles, polyacrylonitrile resin particles, silicon dioxide particles, or aluminum oxide particles, it is possible to favorably configure the mold material 1 using a method of molding the mold object where the UV ink 8 is discharged using an ink jet system or the like and the mold material 1 is bonded at specific locations.

In addition, due to the average spherical equivalent diameter of the particles 2a which configure the mold material 1 being 0.1 µm or more and 30 µm or less, it is possible for the thickness of each layer in the molding method of molding by layering layers to be, for example, approximately several µm to 100 µm. As a result, it is possible to mold the mold object with more precision.

In addition, the molding method according to the present example includes heating the mold material 1, which includes the particles 2a and the binder material 3 which bonds together the particles 2a, to a temperature which is equal to or higher than the melting point of the binder material 3 and forming the fluid mold material 4. Since the mold material 1 which is configured by the particles 2a includes the binder material 3 which bonds together the particles 2a, it is not easy for the particles 2a to be scattered due to being secured (bonded) using the binder material 3 even with, for example, fine particles (a powder) which are easily scattered and dispersed in air.

In addition, the molding method according to the present example includes forming the mold layer 5 by spreading the fluid mold material 4 which is heated to a temperature which is equal to or higher than the melting point of the binder material 3 and cooling to a temperature which is less than the melting point of the binder material 3. It is possible to easily spread the mold material 1 in a state where scattering of the particles 2a is suppressed along with the binder material 3 which is dissolved at a temperature which is equal to or higher than the melting point of the binder material 3. It is possible to spread the mold material 1 easily into layers with substantially uniform thickness by using the squeegee 31 on the stage 41 which is horizontal. It is possible to obtain layers (the mold layers 5) with substantially uniform thickness which are solid by cooling the layers of the mold material 1 which are spread to a temperature which is less than the melting point of the binder material 3 again. In this manner, it is possible to obtain a favorable layered structure in order to mold the mold object by layering and solidifying the mold material 1 while spreading.

In addition, the molding method according to the present example includes applying the UV ink 8 to the desired region of the mold layer 5 which is layered and curing the UV ink 8 which is applied to the desired region of the mold layer 5. By curing the desired region of the mold layer 5 which is layered, the desired mold object is formed. The particles 2a are bonded by the binder material 3 without easily scattering even in a case where, for example, the UV ink 8 is discharged using an ink jet system with regard to the mold layer 5 which is layered. As a result, since blocking of the nozzle which discharges the UV ink 8, which is due to the particles 2a which are scattered and dispersed, is suppressed, it is possible to stably and favorably mold the desired mold object.

In addition, since the liquid droplets (the UV ink 8) are photo-curable ink, it is possible to easily cure a desired region of the mold layer by irradiating light (ultraviolet rays) onto the UV ink 8 which is applied onto the desired region of the mold layer 5.

In addition, the mold object which is molded according to the molding method of the present embodiment is stably molded in a desired shape. That is, the mold object is provided which is supplied on the basis of more stable production and more stable product quality.

In addition, the molding apparatus 100 according to the present example is provided with the heating section 20 which heats the mold material 1, which includes the particles 2a and the binder material 3 which bonds together the particles 2a, to a temperature which is equal to or higher than the melting point of the binder material 3 and forms the fluid mold material 4. Since the mold material 1 which is configured by the particles 2a includes the binder material 3 which bonds together the particles 2a, it is not easy for the particles 2a to be scattered due to being secured (bonded) using the binder material 3 even with, for example, fine particles (a powder) which are easily scattered and dispersed in air.

In addition, the molding apparatus 100 according to the present example is provided with the spreading section 30, which forms the mold layer 5 by spreading the fluid mold material 4 which is heated to a temperature which is equal to or higher than the melting point of the binder material 3 and cooling to a temperature which is less than the melting point of the binder material 3, and the molding section 40 which layers the mold layers 5. It is possible to easily spread the mold material 1 in a state where scattering of the particles 2a is suppressed along with the binder material 3 which is in a liquid state at a temperature which is equal to or higher than the melting point of the binder material 3. With the spreading section 30, it is possible to spread the mold material 1 easily into layers with substantially uniform thickness by using the squeegee 31 on a horizontal flat plate. It is possible to obtain layers (the mold layers 5) with substantially uniform thickness which are solid by cooling the layers of the mold material 1 (the fluid mold material 4) which are spread to a temperature which is less than the melting point of the binder material 3 again. In this manner, it is possible to obtain a favorable layered structure in order to mold the mold object by layering and solidifying the mold material 1 while spreading.

The method of cooling the binder material 3 to a temperature which is less than the melting point of the binder material 3 is not particularly limited and there may be cooling at a natural rate using the surrounding air or there may be a blowing unit which proactively blows cold air.

In addition, the molding apparatus 100 according to the present example is provided with the drawing section 50 which applies the UV ink 8 to the desired region of the mold layer 5 which is layered and the curing section 60 which cures the UV ink 8 which is applied to the desired region of the mold layer 5. By curing the desired region of the mold layer 5 which is layered, the desired mold object is formed. With the drawing section 50, the particles 2a are bonded by the binder material 3 without easily scattering even in a case where, for example, the UV ink 8 is discharged using an ink jet system with regard to the mold layers 5 which are layered. As a result, since blocking of the nozzle which discharges the UV ink 8, which is due to the particles 2a which are scattered and dispersed, is suppressed, it is possible to stably and favorably mold the desired mold object.

In addition, since the curing section 60 has the ultraviolet ray irradiating unit 61 as the light irradiating means, it is possible to use ultraviolet ray curable ink (the UV ink 8) as the liquid droplets. It is possible to easily cure the desired region of the mold layer 5 by irradiating ultraviolet rays onto the UV ink 8 which is applied to the desired region on the mold layer 5.

A cationic polymerization ultraviolet ray curable resin, which is cured using a polymerization reaction where cations are activated, and a radial polymerization ultraviolet ray curable resin, which is cured using a polymerization reaction where radicals are activated, are included as the ultraviolet ray curable ink (the UV ink 8). It is possible to use the ultraviolet ray curable ink (the UV ink 8) which belongs to any of these.

As the radial polymerization ultraviolet ray curable resin, there are the examples of, for example, acrylic resin, unsaturated polyester resin, and the like. Here, as the acrylic resin, there are the examples of, for example, polyester acrylate resin, epoxy acrylate resin, urethane acrylate resin, and polyether acrylate resin. As the cationic polymerization ultraviolet ray curable resin, there are the examples of, for example, epoxy resin, oxetane resin, vinyl ether resin, and silicone resin. Here, as the silicone resin, there are the examples of, for example, acrylic silicone resin, polyester silicone resin, epoxy silicone resin, mercaptopurine silicone resin It is preferable that the same material is used in the ultraviolet ray curable ink (the UV ink 8) and the particles 2a which configure the mold material 1 in a case where it is necessary to have strength in the three dimensional solid model. It is difficult for peeling to occur at the interfaces of the particles 2a due to the surfaces of the particles 2a dissolving due to the ultraviolet ray curable ink (the UV ink 8) in a case where, for example, a plastic material is used as the particles 2a, and strength of the three dimensional solid model is improved as a result. It is possible to use a solubility parameter as an indicator. As examples, in a case where a radial polymerization acrylic resin (solubility parameter: 9.5) is used, it is preferable to use acrylic resin (solubility parameter: 9.5) and polyethylene resin (solubility parameter: 7.9) which are similar materials for the particles 2a and not use polyacrylonitrile resin (solubility parameter: 15.4) and nylon resin (solubility parameter: 13.6).

Here, the present invention is not limited to the embodiment described above and adding of various modifications, improvements, and the like to the embodiment described above are possible. A modified example will be described below. Here, the same reference numeral are used for the configuring portions which are the same as the embodiment described above and overlapping descriptions are omitted.

Modified Example

The ultraviolet ray curable ink (the UV ink 8) being used as the liquid droplets and the curing section 60 having the ultraviolet ray irradiating unit 61 are described in the embodiment, but the present invention is not limited to this. For example, there may be a configuration where a thermosetting ink is used as the liquid droplets and the curing section 60 has a heating means which cures by heating the thermosetting ink which is applied to the mold layer 5.

Even with this configuration, it is not easy for the particles 2a to scatter since the particles 2a is secured (bonded) using the binder agent 3 which bonds together the particles 2a even with, for example, fine particles (a powder) which are easily scattered and dispersed in air as in the embodiment described above. As a result, scattering and dispersing of the particles 2a is suppressed even with a method of molding the mold object where the UV ink 8 is discharged onto the mold material 1 using an ink jet system and the mold material 1 is bonded at specific locations. For this reason, the nozzle which discharges the UV ink 8, which is due to the particles 2a, is not (or is suppressed from being) blocked and it is possible to stably and favorably mold the desired mold object.

In addition, it is possible to mold the mold object which is provided with sufficient curing strength by using thermosetting ink and providing a heating means which cures the thermosetting ink in a case such as where curing of the mold layer is not sufficiently performed with photo-curable ink in, for example, a case where the mold material is configured by a material which is highly opaque or where the mold layer is configured to be thick.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A mold material adapted to be used in a molding method including applying liquid droplets to a desired region of a layer formed using the mold material, the mold material comprising:
   particles; and
   a thermoplastic binder which bonds together the particles, the thermoplastic binder including pieces having a thickness which is greater than a smallest gap among gaps between two adjacent particles and smaller than a largest gap among gaps between two adjacent particles, with each of the gaps being located on a line connecting a center of a first particle of two adjacent particles and a center of a second particle of the two adjacent particles.

2. The mold material according to claim 1, wherein a melting point of the thermoplastic binder is 30° C. or more and 90° C. or less.

3. The mold material according to claim 1, wherein the thermoplastic binder is soluble in an aqueous solution.

4. The mold material according to claim 1, wherein the thermoplastic binder includes at least one of polyethylene glycol, polyether-modified silicone, water soluble nylon, polycaprolactone diol, paraffin wax, fatty acid, and fatty acid amide.

5. The mold material according to claim 1, wherein the particles include one type or two or more types of particles which are selected from acrylic resin particles, silicone resin particles, acrylic silicone resin particles, polyethylene resin particles, polystyrene resin particles, nylon resin particles, polyacrylonitrile resin particles, silicon dioxide particles, and aluminum oxide particles.

6. The mold material according to claim 1, wherein
an average spherical equivalent diameter of the particles is 0.1 μm or more and 30 μm or less.

7. The mold material according to claim 1, wherein
a volume of the thermoplastic binder is smaller than a gap between the particles.

* * * * *